United States Patent
Dee

[15] 3,685,875
[45] Aug. 22, 1972

[54] BEARING MEMBER

[72] Inventor: Colin William Dee, Greenacres, 34 Canford Bottom, Wimborne, Dorset, England

[22] Filed: Nov. 12, 1970

[21] Appl. No.: 88,663

[30] Foreign Application Priority Data

Oct. 9, 1970 Great Britain..........48,122/70

[52] U.S. Cl.................................................308/9
[51] Int. Cl..............................................F16c 17/16
[58] Field of Search.......................................308/9

[56] References Cited

UNITED STATES PATENTS

| | | | |
|---|---|---|---|
| 3,186,774 | 6/1965 | Wilcox | 308/9 |
| 3,201,181 | 8/1965 | Cherubim | 308/9 |
| 3,410,616 | 11/1968 | Dee | 308/9 |
| 3,437,387 | 4/1969 | Dee | 308/9 |
| 3,510,175 | 5/1970 | Dee | 308/9 |

Primary Examiner—Martin P. Schwadron
Assistant Examiner—Frank Susko
Attorney—William Anthony Drucker

[57] ABSTRACT

A bearing member, for use in an externally pressurized fluid bearing capable of operation without design change on gases, vapors and liquids, of that kind in which a body-of-rotation bearing gap is defined between a bearing surface of a first relatively rotatable bearing member and an opposed bearing surface of a second relatively rotatable bearing member, has first and second elements each with the bearing surface thereon, said elements each including a respective one of a pair of opposed contact faces. Spacer means, e.g., a shim, having opposed major faces is disposed between the elements such that each of its major faces abuts in fluid-tight sealing engagement with the contact face of a respective one of the elements, the contact faces and the spacer means defining at least one fluid feed passage opening at one end adjacent to the bearing surface of the bearing member.

2 Claims, 8 Drawing Figures

INVENTOR:

COLIN W. DEE

INVENTOR:
COLIN W. DEE

BEARING MEMBER

This invention relates to fluid bearings of the externally pressurized type, capable of operation without design change on gases, vapors and liquids, in which a body of rotation bearing gap is defined between a bearing surface of a first relatively rotatable bearing member and an opposed bearing surface of a second relatively rotatable bearing member, and in which fluid under greater than ambient pressure is fed to that bearing gap through one or more fluid feed passages in one or both of the bearing members. A plurality of such passages may be spaced about a circumference of the bearing member so as to distribute the bearing fluid in the bearing gap. Such passages are normally of relatively very small axial thickness (in a journal bearing) or radial thickness (in a thrust bearing) and this dimension is normally very critical for the optimum operation of the bearing.

The object of the present invention is to provide an improved construction of bearing member which permits the provision in a simple manner of a fluid feed passage or passages the dimensions of which are determined with a very high degree of accuracy.

According to the present invention such a bearing member comprises first and second elements having the bearing surface thereon, said first and second elements each including a respective one of a pair of opposed contact faces, and spacer means having opposed major faces disposed between the elements such that each of its major faces abuts in fluid-tight sealing engagement with the contact face of a respective element, the contact faces and the spacer means defining at least one fluid feed passage opening at one end in the direction of flow towards the bearing surface of the bearing member.

For a journal bearing, the contact face of each element would have a component of radial direction, and would advantageously be plane. For a thrust bearing, the contact face of each element would have a component of axial direction, and would advantageously be arcuate.

For the limiting case of a journal bearing where there is an infinite number of passages about the circumference, the fluid is fed in through a complete circumferential passage, and the axial width of that passage is determined by the axial thickness of the spacer means.

For a bearing member having one or more slot-like feed passages opening into the bearing gap, the spacer means has (for each slot-like feed passage required) an elongated aperture of which an end in the direction of flow towards the bearing surface is open, whereby the longitudinal edge surfaces of the lands of the spacer means and contact faces of the two bearing elements between them define a slot-like fluid feed passage, the thickness of said passage being determined by the thickness of the spacer means and the angular width of said passage being determined by the angular separation of the longitudinal edge surface of the lands defining the aperture.

It is comparatively a simple matter, under production conditions, to prepare bearing elements having plane contact faces for journal bearings, or cylindrical or tapered contact faces for thrust bearings, and spacer means of a very precise thickness and with an aperture of a very precise angular width. To prepare a bearing member from such components, it is only necessary to present the two bearing elements in abutment one at each major face of the spacer means, and thereafter to retain the components in assembly. The cross-sectional dimensions of the slot-like feed passage are determined solely by the dimensions of the spacer means, so that the two bearing elements can be used for the assembly of bearings of differing characteristics, merely by inserting between them a different spacer means.

Where a plurality of such slot-like feed passages is required, distributed at preferably equally angularly spaced intervals about the axis of rotation of the bearing, the spacer means may incorporate the appropriate number of elongated apertures. It is desirable in such a case for a single spacer element (considered in the circumferential direction) to incorporate all of the elongated apertures. For an outer journal bearing member, or for a thrust bearing member, the apertures may all open at their radially-inner end, and would accordingly be closed at their radially outer ends. For an inner bearing member, or a thrust bearing member, the inverse applies.

In order to permit the feed of fluid to a plurality of such apertures provided in a single spacer element, the apertures are made longer, in their direction of elongation, than is required for the calculated dimension of the slot-like passage. In a journal bearing the radial extent of the plane contact face of one (or both) of the elements is made less than that of the apertures, thereby permitting flow of the pressure fluid in an axial direction into the outer end area of the elongated apertures, e.g. from a coaxial annular plenum chamber recess in one or both of the elements.

In a convenient form of bearing assembly, the slot-like fluid feed passages are all of the same cross-sectional dimensions and are distributed at equally-angular spaced intervals about the axis of rotation of the bearing. For a journal bearing, the median line of symmetry of their elongated dimension is situated in the same radial plane and radially with respect to the axis of rotation of the bearing. Such passages can readily be provided in a single piece of sheet material having parallel major faces, e.g. a metal shim. For inclusion in an outer journal bearing member, the shim is cut so as to have a circular opening which corresponds approximately with the inner circumference of the bearing member, and a plurality of parallel-sided similar and equally spaced apertures extending radially outwards from the circular opening, the lands between the apertures being preferably radiussed at their end such that the fluid flow has a smooth transition from the slot exit into the bearing gap. The exit edges of the two elements between which the shim member is held are preferably also radiussed to provide for a smooth transition from the exit of the slot formation into the bearing gap such that the vortice effects that are experienced in the change of flow direction formed by the right angle between slot and bearing gap are attenuated and laminar conditions pertain.

For a "single-entry" bearing, i.e. a bearing having a single circumferential row of slot-like fluid feed passages opening into the bearing gap, such a shim is disposed between and in abutment with two bearing elements which are secured in position by any convenient means, e.g. by adhesive or bonding, or incorporation within a body of settable material, or by mechanical securing such as clamping by a plurality of metal screws, or nut and bolt assemblies, extending through the two elements, and the shim, parallel to the axis of rotation. For a journal bearing, one of the elements has a plane radial contact face of which the radial dimension is the same as that of the shim. The other element has a plane radial contact face of which the radial dimension is the same as that of the shim, but which includes in that contact face an axially extending circumferential recess coaxial with the axis of rotation. The circumferential recess is preferably in a radially-intermediate position of the contact face so that the shim abuts the remainder of the contact face both radially internally and radially externally of the circumferential recess.

For a thrust bearing, one of the bearing elements has a frusto-conical inner contact face, and the other bearing element has a correspondingly frusto-conical outer contact face, the axial length of that face being less than that of the elongated finger portions of the shim, When the shim is assembled between the two frusto-conical contact faces, the elongated finger portions of the shim are bent over to lie along the conicity of the contact faces, whereas the outer ring of the shim remains purely radial between two clamping faces of the elements. The annular space defined between the two frusto-conical contact faces has the finger portions of the shim distributed in it so as to define a plurality of passages for flow of fluid into a thrust bearing gap defined between that bearing element and another bearing element having, for example, a purely radial bearing face. The axial length of one of the contact faces is less than that of the shim fingers, and an annular plenum recess in that element communicates with one end of each of the apertures formed between the fingers.

In order that the nature of the invention may be readily ascertained, some embodiments of bearing assemblies constructed in accordance therewith are hereinafter particularly described with reference to the accompanying drawings, wherein.

Figure 1:
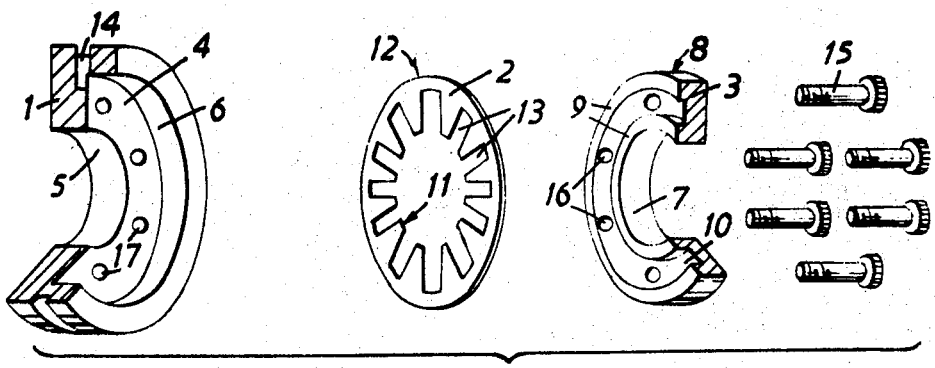
FIG. 1 shows, in perspective view and in separated condition the elements of an embodiment of outer journal bearing assembly having a single circumferential row of fluid feed passages.

Referring to Fig. 1, the outer bearing assembly comprises a first element 1, a shim 2, and a second element 3. The element 1 has a plane radial contact face 4 defined between an inner circumference 5 and an inner circumference 6. The inner circumference 5 is the internal circumference of the bearing member and is a bearing surface forming one of the boundaries of the bearing gap. The inner bearing element is not shown, but could be a plain cylindrical shaft.

The second element 3 has an inner bearing surface circumference 7 corresponding to the circumference 5, and an outer circumference 8 which is a clearance fit within the circumference 6. Between the circumferences 7 and 8 there is defined a plane radial contact face 9 which is divided into two portions by an axially-extending annular recess 10.

The shim 2 has a internal circumference 11 which corresponds to circumferences 5 and 7, and an outer circumference 12 which is a clearance fit within circumference 6. The opposed major faces of the shim each abut against a respective contact face of an element. In the shim there are provided a plurality of similar symmetrically disposed elongated apertures 13 which terminate at their radially outer end at about the same circumference as the outer boundary of the recess 10. The element 1 has a radial fluid feed channel 14 which communicates through one of the apertures 13, with the annular recess 10 acting as a plenum chamber. The elements 1 and 3 and the shim 2 are all retained in assembly by a set of metal screws 15 engaged through clearance holes 16 in element 2 and threaded into threaded holes 17 in element 1. The screws pass through apertures 13 of the shim.

Figure 2:
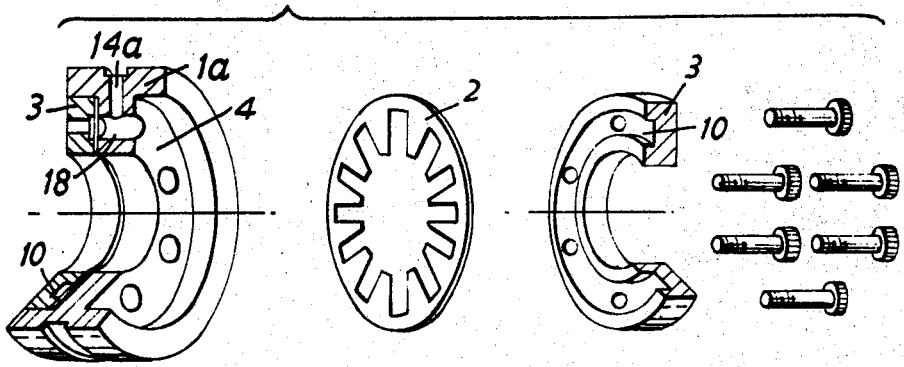
FIG. 2 shows, in perspective view and partly in separated condition the elements of a first embodiment of outer journal bearing assembly having two circumferential rows of fluid feed passages.

Referring now to fig. 2, there is shown a somewhat similar bearing assembly, but wherein two circumferential rows of slot-like feed passages are provided. For this purpose, the element 1a has two radial contact faces 4, and a respective shim 2 is retained in abutment with each of those contact faces by one of two elements 3. The radial feed channel 14a opens into an axial channel 18 to permit feed to both of the plenum chamber recesses 10.

Figure 3:
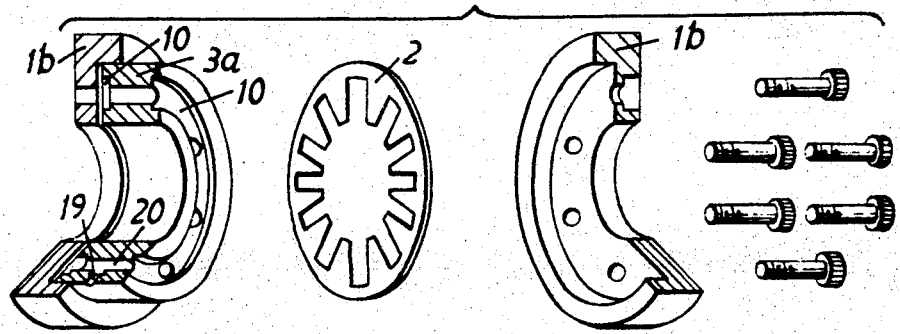
FIG. 3 shows, in perspective view and partly in separated condition the elements of a second embodiment of outer journal bearing assembly having two circumferential rows of fluid feed passages.

Referring now to fig. 3, there is shown a bearing assembly in which a central element 3a has a plenum recess 10 at each end. A shim 2 is abutted against each end contact face of the element 3a and an element 1b is abutted against each shim 2. In this case, feed of fluid to the plenum chamber recesses 10 is achieved through radial fluid feed channels 19 leading to axial channels 20 opening at each end into a plenum recess 10.

Figure 4:
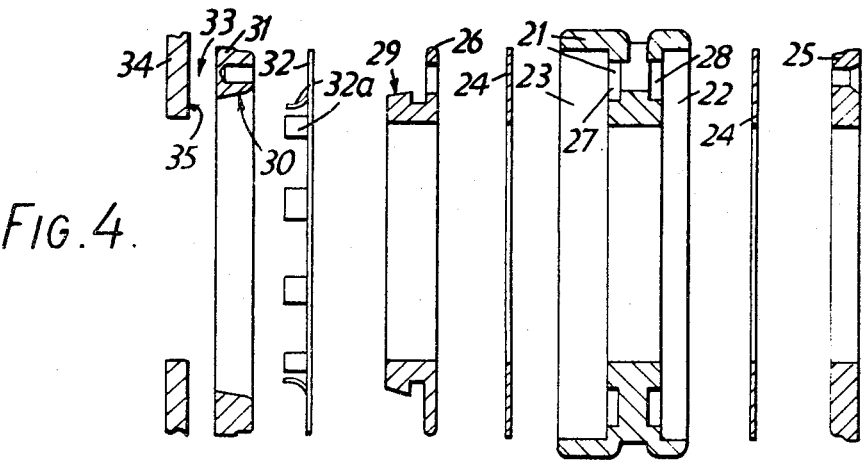
FIG. 4 is an axial sectional view of the elements, in separated condition, of an embodiment of bearing assembly serving both as the outer member of a journal bearing, and as one member of a thrust bearing.

Referring now to fig. 4, there is shown a bearing member which provides for two rows of passages feeding fluid radially inwardly to a journal bearing gap, and one row of passages feeding fluid substantially axially to an axial thrust bearing gap.

The journal bearing portion is constituted by an element 21 having annular recesses 22, 23 to receive respective shims 24 clamped by associated elements 25, 26 and defining two circumferential rows of fluid feed passages in a manner similar to that described above in relation to fig. 2, with the exception that the annular plenum recesses 27, 28 are both formed in the element 21.

The element 26 further has an external frusto-conical contact face 29 which corresponds to an internal frusto-conical contact face 30 of an element 31. A shim 32, similar to those described above for figs. 1 to 3, is inserted between the two contact faces 29 and 31. When all of the elements are assembled into position, in which they would be retained by bolts (not shown), the fingers 32a of the shim 32 become deformed so as to lie along the contact faces 29, 30. There is thus formed a frusto-conical fluid feed gap in which fluid feed passages are defined between the fingers 32a and the two contact faces 29, 30. The thrust bearing gap would be defined at 33 between the element 31 and another separate bearing member 34 having a plane radial face 35.

The same method of assembly may be utilized for the inner bearing member of a fluid bearing. The shim then has lands at its inner circumference instead of at its outer circumference, and the slot-like passages open at the external circumference of the bearing member, see figs. 5, 5a and 6.

Figure 5:
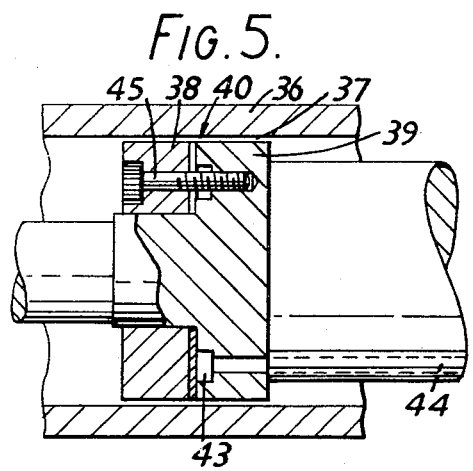
FIG. 5 is a central axial section of an embodiment of bearing assembly serving as the inner bearing member of a journal bearing, and having a single row of feed passages.
Figure 5A:
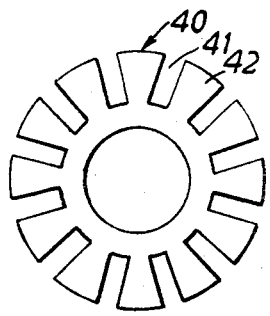
FIG. 5a is a front elevation of a spacer shim used in the construction of Fig. 5.

Referring now to figs. 5 and 5a there is shown an inner journal bearing member situated within an outer bearing member 36 and defining therewith a bearing gap 37, fed by a single circumferential row of feed passages. The inner bearing member comprises two elements 38 and 39 having plane radial contact faces between which is clamped a shim 40 as shown in fig. 5a. The passages 41 defined between the fingers 42 are radially long enough to open into an annular plenum recess 43 fed through an axial supply channel 44. Bolts 45 hold the elements 38 and 39 in assembly.

Figure 6:
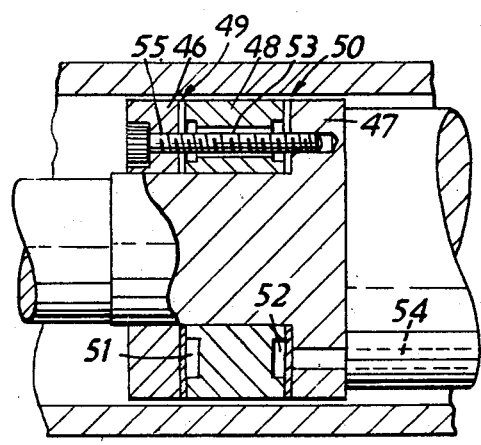
FIG. 6 is a central axial section of an embodiment of bearing assembly serving as the inner bearing member of a journal bearing, and having two rows of feed passages.

Referring to fig. 6, the inner journal bearing assembly comprises end elements 46 and 47, and an intermediate element 48. A shim 40 of the kind shown in FIG. 5a is clamped at 49 between the elements 46 and 48, and another such shim is clamped at 50 between the elements 48 and 47. The passages 41 of the two shims 40 receive a feed of fluid through respective plenum recesses 51, 52 which communicate through axial channels 53. Plenum recess 52 receives a fluid supply through an axial supply channel 54. The elements are held in assembly by bolts 55 disposed with clearance in the axial channels 53. This construction provides two circumferential rows of fluid feed passages, at positions denoted by references 49 and 50.

Figure 7:
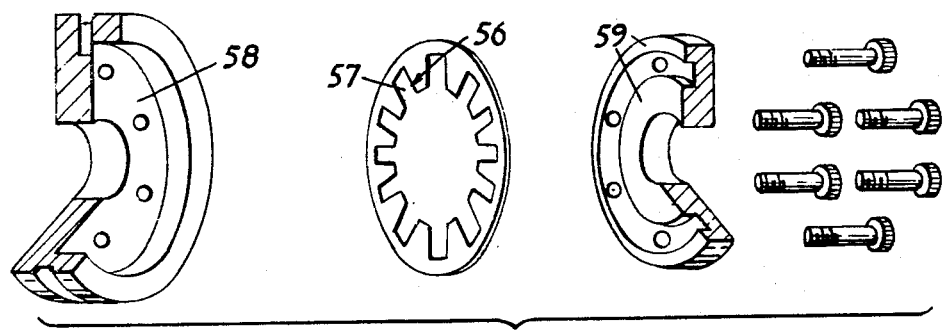
FIG. 7 shows a modification of the embodiment of Fig. 1.

In each of the constructions described above, it is assumed that the tips of the shim fingers, between which the fluid feed apertures are provided, extend up to or at least adjacent to the bearing surface of the bearing member. In a further form of construction the fingers and apertures extend only part of the way from the plenum chamber towards the bearing surface, such that the apertures open into a full circumferential opening which itself opens at the bearing surface into the bearing gap. Fig. 7 shows an embodiment which corresponds generally to that of Fig. 1 but in which the fingers 56 and apertures 57 extend only about half-way radially inwards across the contact faces 58 and 59. The inner end of each aperture 57 then opens into a full circumferential opening defined between the inner ends of the fingers 56, and the radially innermost portions of the faces 58 and 59. Figs. 4, 5 and 6 could be similarly modified.

I claim:

1. A bearing member for use in an externally pressurized fluid bearing of that kind in which a body-of-rotation bearing gap is defined between a bearing surface of a first relatively rotatable bearing member and an opposed bearing surface of a second relatively rotatable bearing member, said bearing member comprising first and second annular elements each of which has thereon a respective axially distinct portion of the bearing surface, said first and second elements each including a respective one of a pair of axially opposed contact faces, and an annular spacer having axially opposed major faces disposed between the two elements such that each of the major faces of the spacer abuts in fluid-tight sealing engagement with the contact face of a respective element, said spacer having a plurality of radial apertures extending through it from one major face to the other and defined between angularly spaced lands, each of said apertures being open at one radial end, the longitudinal edge surfaces of the lands of the spacer means and portions of the respective contact faces of the two elements together defining a plurality of slot-like fluid feed passages opening at said one end towards the bearing surface, one of said elements including in its contact face an annular recess communicating with said radial apertures of the spacer, said bearing member including passage means communicating with said recess for feed of fluid through the recess and the slot-like passages.

2. A bearing member, as claimed in claim 1, wherein the lands of the spacer means are equally angularly spaced, and wherein the pair of longitudinal edge surfaces of the lands defining each feed passage are parallel.

* * * * *